United States Patent [19]
Diefenbach et al.

[11] Patent Number: 5,712,349
[45] Date of Patent: *Jan. 27, 1998

[54] WATER DISPERSIBLE BINDERS FOR CATIONIC ELECTROCOATING FINISHES AND A PROCESS FOR THEIR PREPARATION

[75] Inventors: Horst Diefenbach, Nottuln; Arnold Dobbelstein; Michael Geist, both of Münster, all of Germany

[73] Assignee: BASF Farben Fasern Aktiengesellschaft, Hamburg, Germany

[*] Notice: The term of this patent shall not extend beyond the expiration date of Pat. No. 4,724,254.

[21] Appl. No.: 744,554

[22] Filed: Nov. 6, 1996

Related U.S. Application Data

[63] Continuation of Ser. No. 474,202, Jun. 7, 1995, abandoned, which is a continuation of Ser. No. 296,620, Aug. 24, 1994, abandoned, which is a continuation of Ser. No. 163,191, Dec. 6, 1993, abandoned, which is a continuation of Ser. No. 956,828, Oct. 5, 1992, abandoned, which is a continuation of Ser. No. 809,091, Dec. 10, 1991, abandoned, which is a continuation of Ser. No. 689,125, Apr. 22, 1991, abandoned, which is a continuation of Ser. No. 547,325, Jul. 2, 1990, abandoned, which is a continuation of Ser. No. 393,061, Jul. 31, 1989, abandoned, which is a continuation of Ser. No. 727,460, Apr. 26, 1985, abandoned, which is a division of Ser. No. 432,960, Sep. 27, 1982, abandoned.

[30] Foreign Application Priority Data

Mar. 4, 1981 [DE] Germany ............... 31 08 073.1

[51] Int. Cl.$^6$ ............... C08G 59/14; C08L 63/00
[52] U.S. Cl. ............... 525/523; 525/423; 525/533
[58] Field of Search ............... 525/423, 523, 525/533

[56] References Cited

U.S. PATENT DOCUMENTS

| | | | |
|---|---|---|---|
| 3,985,695 | 10/1976 | Tobias et al. | 525/533 |
| 4,104,147 | 8/1978 | Marchetti et al. | 204/181.7 |
| 4,148,772 | 4/1979 | Marchetti et al. | 525/523 |
| 4,302,373 | 11/1981 | Steinmetz | 525/533 |
| 4,373,059 | 2/1983 | Patzschke et al. | 525/533 |
| 4,724,254 | 2/1988 | Geist et al. | 525/533 |

*Primary Examiner*—Amy Woodward
*Attorney, Agent, or Firm*—Kenyon & Kenyon

[57] ABSTRACT

The invention relates to water-dispersible binders for cationic electrocoating finishes, which binders are reaction products of (A) low molecular weight epoxide resins containing aromatic groups and having an epoxide equivalent weight of below 375, (B) aliphatic and/or alicyclic polyfunctional alcohols and/or carboxylic acids having a molecular weight of below 350, (C) if appropriate up to 60% by weight, relative to the total binder, of polyfunctional alcohols, carboxylic acids and/or SH compounds having a molecular weight of 500–5,000 and (D) primary, secondary and/or tertiary amines and/or salts thereof or a sulfide/acid mixture or a phosphine/acid mixture, the reaction product of A and B containing 10–45% of aromatic groups, calculated as the phenylene group. By means of the binders, a higher layer thickness is obtained in electrocoating.

20 Claims, No Drawings

WATER DISPERSIBLE BINDERS FOR CATIONIC ELECTROCOATING FINISHES AND A PROCESS FOR THEIR PREPARATION

This application is a continuation of application Ser. No. 08/474,202, filed on Jun. 7, 1995, now abandoned, which is a continuation of application Ser. No. 08/296,620, filed on Aug. 24, 1994, now abandoned, which is a continuation of application Ser. No. 163,191, filed on Dec. 6, 1993, now abandoned which is a continuation of application Ser. No. 956,828, filed on Oct. 5, 1992, now abandoned, which is a continuation of application Ser. No. 07/809,091, filed on Dec. 10, 1991, now abandoned, which is a continuation of application Ser. No. 07/689,125, filed on Apr. 22, 1991, now abandoned, which is a continuation of application Ser. No. 07/547,325 filed on Jul. 2, 1990, now abandoned, which is a continuation of application Ser. No. 07/393,061, filed on Jul. 31, 1989, now abandoned, which is a continuation of application Ser. No. 06/727,460, filed on Apr. 26, 1985, now abandoned, which is a division of application Ser. No. 06/432,960 filed on Sep. 27, 1982, now abandoned.

The invention relates to water-dispersible binders for cationic electrocoating finishes and based on modified epoxide resins containing ammonium, sulfonium and/or phosphonium groups.

The use of cationic water-dispersible synthetic resins as binders for electrocoating finishes is known. Thus, for example, German Offenlegungsschrift 2,701,002 describes such a resin which is the product from reacting a polyepoxide having a molecular weight of at least 350, a secondary amine and an organic polyol having at least two alcoholic primary hydroxyl groups. The resins are formed by chain-lengthening of high molecular weight polyepoxides having at least 2 epoxide groups per molecule. The chain-lengthening is obtained by means of an organic polyol, and the dispersibility in water is obtained by adding a secondary amine.

This and other known synthetic resins for cathodic electrocoating are frequently used as primer coats, ie. objects coated with them receive an additional top coating layer. However, existing resins have the disadvantage that only coatings of relatively low thickness can be obtained. Thus, German Offenlegungsschrift 2,701,002 indicates obtainable film thicknesses of only 11.4–18 μm. When a coating has to meet particularly high demands in respect of corrosion resistance and surface quality, such as is the case, for example, in coating automotive vehicles and other high value goods, it has therefore been hitherto customary to apply, between the electrocoating primer coat and the top finish, a so-called filler as an additional layer. This is involved and expensive. It is therefore desirable to improve the electrocoating process in such a way that, in this process, higher film thicknesses can be obtained. As already stated above, this is however not possible using existing cationic synthetic resins. The problems are due to the fact that on increasing the deposition voltage above the breakthrough voltage surface imperfections arise in the film by tearing of the layer. Prolonging the coating time also produces an increase in the layer thickness, but this increase cannot be continued as desired, since, due to the electrical resistance of the deposited film, there is normally an upper limit of the layer thickness beyond which, even for infinitely long coating times, virtually no layer thickness growth can be obtained.

It has now been found, surprisingly, that, in electrocoating, higher layer thicknesses can be obtained if binders based on modified epoxide resins which contain aromatic and aliphatic or alicyclic groups in certain ratios are used.

The object of the invention is therefore to indicate water-dispersible binders for cationic electrocoating finishes, by means of the use of which higher layer thicknesses can be obtained.

This object is achieved according to the invention when binders of the abovementioned type comprise the products of reacting (A) low molecular weight epoxide resins containing aromatic groups and having an epoxide equivalent weight of below 375, (B) aliphatic and/or alicyclic polyfunctional alcohols and/or carboxylic acids having a molecular weight of below 350, (C) if appropriate up to 60% by weight, relative to the total binder, of polyfunctional alcohols, carboxylic acids and/or SH compounds having a molecular weight of 500–5,000 and (D) primary, secondary and/or tertiary amines and/or salts thereof or a sulfide/acid mixture or a phosphine/acid mixture, the reaction product of A and B containing 10–45% of aromatic groups, calculated as the phenylene group.

Polyepoxides are suitable for use as component A-low molecular weight epoxide resins containing aromatic groups and having an epoxide equivalent weight of below 375. In the present invention materials can be used as polyepoxides which contain two or more epoxide groups in the molecule. Compounds having two epoxide groups in the molecule are preferable. The polyepoxides have a relatively low molecular weight of at most 750, preferably 400–500. Possible examples of polyepoxides can be polyglycidyl ethers of polyphenols, such as hisphenols, preferably, for example, bisphenol A. It is also possible to prepare these polyepoxides by etherifying a polyphenol with an epihalohydrin in the presence of alkali. Examples of suitable phenol compounds are bis-(4-hydroxyphenyl)-2,2-propane, 4,4'-dihydroxybenzophenone, bis-(4-hydroxyphenyl)-1,1-ethane, bis-(4-hydroxyphenyl)-1',1-isobutane, bis-(4-hydroxytert-butylphenyl)-2,2-propane, bis-(2-hydroxynaphthyl)-methane, 1,5-dihydroxy-naphthalene and hydantoin-epoxides.

Another suitable class of polyepoxides are polyglycidyl ethers of phenolic novolak resins.

Polyglycidyl esters of aromatic polycarboxylic acids can also be advantageously used.

Aliphatic and/or alicyclic polyfunctional alcohols or carboxylic acids having a molecular weight of below 390 are used as component B. These compounds advantageously have a branched aliphatic chain, in particular a chain having at least one quaternary carbon atom.

Suitable compounds correspond to the following general formula:

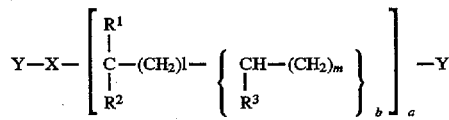

where Y=OH or COOH, X=(CH₂)ₙ

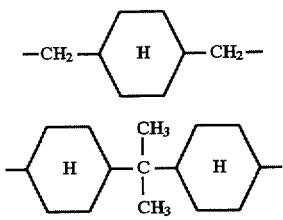

R¹, R² and R³=H or an alkyl radical having 1 to 5 C atoms a=0 or 1, b=0 or 1, l=0–10, and m and n=1–10.

Examples which may be mentioned are diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, butene-2-diol-1,4, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl-2,2-dimethyl hydroxypropionate, 2-methyl-2-propyl-3-hydroxypropyl-2-methyl-2-propyl hydroxypropionate, 4,4'-methylenebiscyclohexanol and 4,4'-isopropylidenebiscyclohexanol. Some preferable diols are 2,2-dimethyl-1,3-propanediol, 3-methyl-1,5-pentanediol, 2,2-dimethyl-3-hydroxypropyl-2,2-dimethyl hydroxypropionate and 4,4'-isopropylidene-bis-cyclohexanol.

A large number of dicarboxylic acids are possible for use as carboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid, mesaconic acid and glutaconic acid.

Examples of dicarboxylic acids preferably used are 2,2-dimethylmalonic acid and hexahydrophthalic acid.

It is essential that the compounds of component B are reacted with component A in a ratio which is such that the reaction product has the indicated content of aromatic groups, calculated as the phenylene group, of 10–15%.

To prepare the reaction product, component C is also additionally used if appropriate. Its content in the total binder is advantageously 10–50 percent by weight.

The polyfunctional alcohols, carboxylic acids and SH compounds suitable for use as component C have a molecular weight of 500–5,000, preferably of 530–3,000. Polyols possible for use in the invention include diols, triols and higher polymeric polyols, such as polyester-polyols and polyether-polyols. Polyester-polyols, and among them the polycaprolactone-polyols, are particularly preferable.

Polyalkylene ether polyols suitable for use as component C correspond to the following formula:

in which R=hydrogen or a lower alkyl radical, optionally having various substituents, n=2 to 6 and m=10 to 50 or even higher. Examples are poly-(oxytetramethylene)-glycols and poly-(oxyethylene)-glycols.

Preferable polyalkylene ether polyols are poly-(oxytetramethylene)-glycols having a molecular weight within the range 500 to 3,000.

The polyester-polyols can also be used as polymeric polyol component (component C) in the invention. The polyester-polyols can be prepared by polyesterifying organic polycarboxylic acids or their anhydrides with organic polyols containing primary hydroxyl groups. The polycarboxylic acids and the polyols are customarily aliphatic or aromatic dicarboxylic acids and diols.

Diols used to prepare the polyesters include alkylene glycols, such as ethylene glycol, butylene glycol, neopentylglycol and other glycols such as cyclohexanedimethanol.

The acid component of the polyester is primarily comprised of low molecular weight carboxylic acids, or their anhydrides, having 2 to 18 carbon atoms in the molecule.

Examples of suitable acids are phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. Instead of using these acids it is also possible to use their anhydrides, provided these exist.

Polyester-polyols derived from lactones can also be used as component C in the invention. These products are obtained by reacting an ε-caprolactone with a polyol. Such products are described in U.S. Pat. No. 3,169,945.

The polylactone-polyols obtained in this reaction are distinguished by the presence of a terminal hydroxyl group and by recurring polyester fractions derived from the lactone. These recurring molecule fractions can correspond to the formula

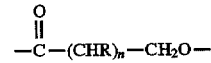

in which n is at least 4, preferably 4 to 6, and the substituent is hydrogen, an alkyl radical, a cycloalkyl radical or an alkoxy radical, no substituent containing more than 12 carbon atoms and the total number of carbon atoms in the substituents on the lactone ring not exceeding 12.

The lactone used as a starting material can be any lactone or any combination of lactones, but this lactone should contain at least 6 carbon atoms in the ring, for example 6 to 8 carbon atoms, and at least 2 hydrogen substituents should be present on the carbon atom which is bonded to the oxygen group of the ring. The lactone used as the starting material can be represented by the following general formula

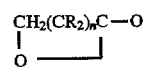

in which n and R have the already indicated meaning.

The lactones which are preferable in the invention for preparing the polyester-polyols are the ε-caprolactones in which n has the value 4. The most preferable lactone is the unsubstituted ε-caprolactone in which n has the value 4 and all the R substituents are hydrogen. This lactone is particularly preferable, since it is available in large amounts and produces coatings having excellent properties. It is also possible to use various other lactones singly or in combination.

Examples of suitable aliphatic diols include ethylene glycol, 1,3-propanediol, 1,4-butanediol and 1,4-cyclohexanedimethanol. An example of a suitable aliphatic triol is trimethylolpropane. Preferable polycaprolactone-polyols have molecular weights within the range 530 to 3,000.

The polyurethanes are another class of resins or polymers which can be used as component C. As is known, the polyurethanes are polyadducts of polyisocyanates and a compound having at least two reactive hydrogen atoms, that is hydrogen atoms which can be detected by the Tserevitinov method.

Examples of suitable compounds having active hydrogen atoms are polyesters of polycarboxylic acids and polyhydric alcohols, polyhydric polyalkylene ethers having at least two hydroxyl groups, polythioether glycols and polyester-amides.

The polyesters or polyester-amides used for preparing the polyurethanes can be branched and/or linear, for example esters of adipic acid, sebacic acid, 6-aminocaproic acid, phthalic acid, isophthalic acid, terephthalic acid, oxalic acid, malonic acid, succinic acid, maleic acid, cyclohexane-1,2-dicarboxylic acid, cyclohexane-1,4-dicarboxylic acid, polyacrylic acid, naphthalene-1,2-dicarboxylic acid, fumaric acid or itaconic acid, with polyalcohols, such as ethylene glycol, diethylene glycol, pentaglycol, glycerol, sorbitol, triethanolamine, di-($\beta$-hydroxyethyl) ether and/or aminoalcohols, such as ethanolamine, 3-aminopropanol, 5-aminopentan-1-ol, 10-aminodecanol, 6-amino-5-methylhexan-1-ol, p-hydroxymethylbenzylamine or with mixtures of these polyalcohols and amines, such as ethylenediamine, 3-methylhexsmethylenediamine, decamethylenedismine and m-phenylenediamine and/or amino-alcohols. In the esterification or amide formation, it is possible to use the acid as such or to use an equivalent compound, such as an acid halide or acid anhydride.

To prepare the polyurethanes, examples of compounds which can be used as alkylene glycol, polyoxyalkylene glycol or polythioalkylene glycol are ethylene glycol, propylene glycol, butylene glycol, 2-methylpentane-2,4-diol, 2-ethylhexane-1,3-diol, hexamethylene glycol, styrene glycol, diethylene glycol, tetraethylene glycol, polythioethylene glycol, polyethylene glycol 200, 400, 600 and higher, dipropylene glycol, tripropylene glycol, trithiopropylene glycol and polypropylene glycol 400, 750, 1,200, 2,000 and higher.

To prepare the polyurethanes, any polyesters, polyesters modified by polyisocyanate, polyester-amides, polyester-amides modified by polyisocyanate, alkylene glycols, alkylene glycols modified by polyisocyanate, polyoxyalkylene glycols and polyoxyalkylene glycols modified by polyisocyanate can therefore be used provided they have free reactive hydrogen atoms, free reactive carboxyl groups and/or, in particular, hydroxyl groups. In particular, any organic compound can be used which has at least two radicals from the class comprising the hydroxyl group and carboxyl group.

Examples of organic polyisocyanates suitable for preparing the polyurethanes are ethylene diisocysnate, propylene-1,2-diisocyanate, cyclohexylene diisocyanate, m-phenylene diisocyanate, 2,4-toluene diisocyanate, 3,3'-dimethoxy-4,4'-biphenylene diisocyanate, 3,3'-dichloro-4,4'-biphenylene diisocysnate, triphenylmethane triisocyanate, 1,5-naphthalene diisocyanate, hydrogenated toluylene diisocyanate, methylenebis-(cyclohexylisocyanate), isophorone diisocysnste, trimethylhexamethylene diisocyanate, lysine diisocysnate methyl ester and polyisocyanatesin blocked, or inactive, form, such as the bisphenyl carbonates of toluylene diisocyanate and 1,5-naphthalene diisocysnate.

Possible polyfunctional SH compounds (component C) are products of reacting organic dishalides with sodium polysulfide. Examples of other SH compounds are products of reacting linear polyesters containing hydroxyl groups, polyethers or polyurethanes with mercaptocarboxylic acids, such as mercaptoacetic acid, 2-mercaptopropionic acid, 3-mercaptopropionic acid, mercaptobutyric acid and the like.

The amine used as component D for the reaction with the epoxide compound can be primary secondary or tertiary, secondary amines being particularly highly suitable. Primary and secondary amines can be added directly to the epoxide ring, while tertiary amines can only be added in the form of their ammonium salts or via another functional group in the molecule. The amine should preferably be a compound which is soluble in water. Examples of such amines are mono- and dialkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like, are also suitable. Dialkylaminoalkylamines, such as, for example, dimethylaminoethylamine, diethylaminopropylamine and the like, are also suitable.

In most cases, low molecular weight amines are used, but it is also possible to use high molecular weight monoamines, in particular if it is intended to increase the flexibility of the resin by incorporating such amines. Mixtures of low molecular weight and high molecular weight amines can also be used in a similar way to modify resin properties.

Polyamines having primary and secondary amino groups can be reacted with the epoxide groups in the form of their ketimines- The ketimines are prepared in a known way from the polyamines.

The amines can also contain yet other groups, but these should not interfere with the reaction of the amine with the epoxy group and should neither lead to gelling of the reaction mixture.

The reaction of the amine with the compound containing epoxy groups frequently occurs already on mixing of these materials. In some instances, it may be desirable to heat to moderately elevated temperatures, for example to 50° to 150° C., but reactions are also possible at lower or higher temperatures. Frequently it is advantageous for completing the reaction to increase, at least slightly, the temperature towards the end of the reaction for a time which is sufficient to guarantee complete conversion.

For the reaction with the epoxy-containing compound, an amount of amine should be used which is at least such that the resin takes on a cationic character, ie. that it migrates to the cathode under the influence of a voltage in the coating bath, on being made soluble by the addition of an acid. In essence, all epoxy groups of the resin can be reacted with an amine. It is however also possible to leave excess epoxy groups in the resin which, on contact with water, hydrolyze and form hydroxyl groups.

Another way of obtaining the required dispersibility in water involves using, as component D, Mannich bases, ie. products of reacting suitable phenols carrying groups which are suitable for reaction with an epoxide ring with formaldehyde and a secondary amine. This, at the same time, renders the binder self-crosslinkable.

The salt of an amine, a sulfide/acid mixture or a phosphine/acid mixture can also be used instead of the amines mentioned or together with the latter. The salt of a tertiary amine can be used as the salt of an amine. Acids which are suitable for neutralizing the amines and which can be used in the invention include boric acid or other acids having a dissociation constant which is greater than that of boric acid, preferably organic acids having a dissociation constant of greater than about $1\times10^{-5}$. The preferable acid is lactic acid. Examples of other acids are formic acid, acetic acid, propionic acid, butyric acid, hydrochloric acid, phosphoric acid, sulfuric acid and carbonic acid.

The amine part of the amine/acid salt is an amine which is unsubstituted or substituted as in the case of hydroxylamine, but these substituents should not interfere with the reaction of the amine/acid salt with the polyepoxide and should not gel the reaction mixture. Preferable amines are tertiary amines, such as dimethylethanolamine, trimethylamine, trimethylamine, triisopropylamine and the like. Examples of other suitable amines are indicated in U.S. Pat. No. 3,839,252, in column 5, line 3, to column 7, line 42.

The amine/acid salt mixture is obtained by reacting the amine with the acid in a known way. It is also possible to use amine/acid mixtures, although, as a rule, they react and form the acid salt.

The reaction temperature for the reaction of the amine/acid salts with the polyepoxides can be varied between the lowest temperature at which the reaction proceeds at a significant rate, for example room temperature or, as a rule, somewhat higher than room temperature, and a maximum temperature between about 100° and about 110° C. The presence of a solvent is not necessary in the reaction, although a solvent is frequently added in order to have better control of the reaction. Possible solvents are aromatic hydrocarbons or monoalkyl ethers of ethylene glycol.

The ratio between the amine/acid salt and the epoxy compound can vary, and the best ratios depend on the specific starting materials used. In general, about 1 to about 50 parts by weight of salt can be used per 100 parts by weight of polyepoxide. In general, the ratio is selected as a function of the nitrogen content derived from the quaternizing agent, which content is typically about 0.05 to about 16%, relative to the total weight of the amine salt and of the polyepoxide.

The resins generally contain the entire amount of nitrogen in the form of chemically bonded quaternary ammonium salt groups, although, in some cases, less than 100% of the nitrogen is present in the form of quaternary ammonium salt groups. An example of such a case is given when primary and secondary amines are used to prepare the resins having quaternary ammonium salt groups. Such resins contain as a rule secondary and tertiary amine salt groups.

Resins having phosphonium groups can be prepared by reacting the epoxide compounds characterized above with a phosphine in the presence of an acid and forming a resin having a group of a quaternary phosphonium base.

The phosphine used can be any phosphine which does not contain interfering groups. Examples of such phosphines are aliphatic, aromatic and alicyclic phosphines, and the following phosphines may be mentioned as specific examples:

low trialkylphosphines, such as trimethylphosphine, triethylphosphine, tripropylphosphine or tributylphosphine, mixed low alkylphenylphosphines, such as phenyldimethylphosphine, phenyldiethylphosphine, phenyldipropylphosphine, diphenylmethylphosphine, diphenylethylphosphine, diphenylpropylphosphine or triphenylphosphine and alicyclic phosphines, such as tetramethylenemethylphosphine and the like.

The acid used can be any acid which forms the quaternary phosphonium salt. However, the acid preferably is an organic carboxylic acid. Examples of suitable acids are boric acid, lactic acid, formic acid, acetic acid, propionic acid, butyric acid, hydrochloric acid, phosphoric acid and sulfuric acid.

The acid should preferably have a dissociation constant of greater than about $10^{-5}$.

The ratio of phosphine to acid is not particularly critical. Since one equivalent of acid is necessary to form one mole of phosphonium group, at least about one equivalent of acid is preferably used per each mole of the desired conversion of phosphine to phosphonium.

The phosphine/acid mixture and the epoxide compound are reacted by mixing the components, heating to moderately elevated temperatures being occasionally used. The reaction temperature is not particularly critical, and it is chosen according to the starting materials and their reaction rates. The reaction frequently proceeds at satisfactory rates at room temperature or at elevated temperatures up to 70° C. In some cases it is advisable to use higher temperatures, such as of about 110° C. or higher. A solvent is not necessary, although in many cases it can be used to improve control of the reaction. Examples of suitable solvents are aromatic hydrocarbons, monoalkyl ethers of ethylene glycol and aliphatic alcohols. The proportions of phosphine and of epoxide compound can be varied, and the optimal proportions depend on the specific starting materials. However, usually about 1 to about 50 parts by weight of phosphine are used per 100 parts by weight of the epoxide compound. The proportions are frequently indicated relative to the proportion of phosphine, typically about 0.1 to about 35% by weight of phosphine, relative to the total weight of phosphine and epoxide compound, being used.

Resins having sulfonium groups can be prepared by reacting the epoxy compounds characterized above with a sulfide in the presence of acid and forming a resin having groups of a quaternary sulfonium base.

The sulfides used can be any sulfide which reacts with epoxy groups and does not contain groups which interfere with this reaction. The sulfide can be an aliphatic, mixed aliphatic aromatic, aralkylic or cyclic sulfide. Examples of such sulfides are dialkyl sulfides, such as diethyl sulfide, dipropyl sulfide, dibutyl sulfide or dihexyl sulfide and alkylphenyl sulfides, such as diphenyl sulfide or ethylphenyl sulfide and alicyclic sulfides, such as tetramethylene sulfide or pentamethylene sulfide, and hydroxyalkyl sulfides, such as thiodiethanol, thiodipropanol, thiodibutanol or the like.

The acids used can be any acid which forms a quaternary sulfonium salt. However, the preferable acid is an organic carboxylic acid. Examples of suitable acids are boric acid, formic acid, lactic acid, acetic acid, propionic acid, butyric acid, hydrochloric acid, phosphoric acid and sulfuric acid. The acid preferably has a dissociation constant of greater than about $1 \times 10^{-5}$.

The ratio of sulfide to acid is not particularly critical. Since one equivalent of acid is used for forming one mole of a sulfonium group, at least one equivalent of acid is preferably used per any desired mole of conversion of sulfide to sulfonium.

The sulfide/acid mixture and the epoxide compound are reacted by mixing the components and, as a rule, heating to moderately elevated temperatures, such as 70° to 110° C. A solvent is not necessary, although one is frequently used in order to obtain better control of the reaction. Suitable solvents are aromatic hydrocarbons, monoalkyl ethers of ethylene glycol and aliphatic alcohols. The proportions of the sulfide and of the epoxide compound can be varied, and the optimum ratios of the two components depend on the specific starting materials. However, usually about 1 to 50 parts by weight of sulfide are used per 100 parts by weight of the epoxy compound. The ratios are frequently expressed relative to the sulfur content, which is typically about 0.1 to 35%, relative to the total weight of the sulfide and of the epoxy compound.

Since the sulfide or the phosphine react with the epoxy group, less than one equivalent of sulfide or phosphine is used when preferable products containing epoxy groups are desired, so that the resulting resin still contains one epoxy group per average molecule. If it is desired to introduce boron into the resin molecule, this can be effected using an amine borate or a nitrogen-containing ester. The reaction with the boron compound can be carried out simultaneously to the formation of the sulfonium or phosphonium groups, since the reaction conditions are similar.

The specific starting materials, proportions and reaction conditions are so chosen, in agreement with well founded experience, that gelling of the product during the reaction is avoided. Thus, for example, excessively aggressive reaction conditions cannot be used. Similarly, starting materials having reactive substituents which can react with the epoxy compounds are not used, since they could have an adverse effect on the reaction.

To obtain highly resistant coatings by using the binders according to the invention, it is advantageous to add to the electrocoating finish a crosslinking agent which, at elevated temperatures, effects crosslinking of the binder or to modify the binder in such a way that it contains reactive groups which, at elevated temperatures, effect self-crosslinking. A self-crosslinking system can be advantageously obtained by reacting the binder with a partially blocked polyisocyanate which, on average, has one free isocyanate group per molecule and the blocked isocyanate groups of which are stable at room temperature and become deblocked at elevated temperatures and react with the hydroxyl groups formed on opening of the epoxide rings and form a urethane. The binder can be self-crosslinkable by using the Mannich bases already described as component D.

Frequently used methods for crosslinking binders have been disclosed, for example in the following laid-open specifications: German Offenlegungsschrift 2,097,799, European Patent Applications 12,463 and 4,090 and German Offenlegungsschrift 2,752,256.

If crosslinking agents are used, they, as a rule, constitute about 5 to about 60% by weight of binder. About 20 to about 40% by weight of the binder is preferable.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine and polymeric butylated melamine-formaldehyde resins.

Urea-aldehyde crosslinking agents can be prepared in a known way by reacting urea and an aldehyde to the resol stage and alkylating the reaction product with an alcohol under acid conditions, an alkylated urea-aldehyde resin being obtained. An example of a suitable cross-linking agent based on a urea-aldehyde resin is a butylated urea-formaldehyde resin.

The crosslinking agents used can also be blocked polyisocyanates. In the invention, any polyisocyanates can be used in which the isocyanate groups have been reacted with a compound, so that the blocked polyisocyanate formed does not react with hydroxyl groups at room temperature, but does react at elevated temperatures, as a rule within the range from about 90° to about 300° C. In the preparation of the blocked polyisocyanates, any organic polyisocyanates suitable for crosslinking can be used. Those isocyanates are preferable which contain about 3 to about 36, particularly about 8 to about carbon atoms. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyanatophenyl)-methane, 4,4'-diisocyanatodiphenyl ether and 2,3-bis-(8-isocyanatooctyl)-4-octyl-5-hexylcyclohexene. It is also possible to use polyisocyanates of higher isocyanate functionality. Examples of these are tris-(4-isocyanatophenyl)-methane, 1,3,5-triisocyanatobenzene, 2,4,6-triisocyanatotoluene, 1,3,5-tris-(6-isooyanatohexyl)-biuret, bis-(2,5-diisocyanato-4-methylphenyl)-methane and polymeric polyisocyanates, such as dimers and trimers of diisocyanatotoluene. It is also possible to use mixtures of polyisocyanates.

Organic polyisocyanates which, in the invention, come into consideration for use as crosslinking agents can also be prepolymers which are derived, for example, from a polyol, including from a polyether-polyol or from a polyester-polyol. Here, as is known, polyols are reacted with an excess of polyisocyanates and prepolymers having terminal isocyanate groups are formed. Examples of polyols which can be used for this reaction are simple polyols, such as glycols, for example ethylene glycol and propylene glycol, and other polyols, such as glycerol, trimethylolpropane, hexanetriol and pentaerythritol, and also monoethers, such as diethylene glycol and tripropylene glycol, and polyethers which are condensates of such polyols with alkylene oxides. Examples of alkylene oxides which are suitable for condensing with these polyols with the formation of polyethers are ethylene oxide, propylene oxide, butylene oxide and styrene oxide. These condensates are generally referred to as polyethers having terminal hydroxyl groups. They can be linear or branched. Examples of such polyethers are polyoxyethylene glycol having a molecular weight of 1,540, polyoxypropylene glycol having a molecular weight of 1,025, polyoxytetramethylene glycol, polyoxyhexamethylene glycol, polyoxyynonamethylene glycol, polyoxydecamethylene glycol, polyoxydodecamethylene glycol and mixtures thereof. Other types of polyoxyalkylene glycol ethers can also be used. Those polyether-polyols are particularly suitable which are obtained by reacting such polyols, such as ethylene glycol, diethylene glycol, triethylene glycol, 1,4-butanediol, 1,3-butanediol, 1,6-hexanediol and mixtures thereof; glycerol, trimethylolethane, trimethylolpropane, 1,2,6-hexanetriol, polypentaerythritol, dipentaerythritol, tripentaerythritol, polypentaerythritol, methylglucosides and sucrose with alkylenes, such as ethylene oxide, propylene oxide or mixtures thereof.

For blocking the polyisocyanates, any suitable aliphatic, cycloaliphatic or aromatic alkyl monoalcohols can be used. Examples of the latter are aliphatic alcohols, such as methyl, ethyl, chloroethyl, propyl, butyl, amyl, hexyl, heptyl, octyl, nonyl, 3,3 5-trimethylhexyl, decyl and lauryl alcohol, cycloaliphatic alcohols, such as cyclopentanol and cyclohexanol, and aromatic alkyl alcohols, such as phenylcarbinol and methylphenylcarbinol. Small amounts of high molecular weight and relatively involatile monoalcohols may also be additionally used, and these alcohols, after their elimination, act as plasticizers in the coatings.

Other suitable blocking agents are hydroxylamines, such as ethanolamine, and oximes, such as methylethylketonoxime, acetonoxime and cyclohexanonoxime.

The blocked polyisocyanates are prepared by reacting an adequate amount of an alcohol with the organic polyisocyanate, so that free isocyanate groups are no longer present. The reaction between the organic polyisocyanate and the blocking agent is exothermal. For this reason, the polyisocyanate and the blocking agent are preferably mixed at a temperature which is not higher than 80° C., which is, in particular, lower than 50° C., in order to counteract the exothermal effect.

The blocking agents and polyisocyanates mentioned, in suitable proportions, can also be used for preparing the partially blocked polyisocyanates described above.

The invention also relates to a process for preparing the binders, which comprises reacting (A) low molecular weight epoxide resins containing aromatic groups and having an epoxide equivalent weight of below 375 with (B) aliphatic and/or alicyclic polyfunctional alcohols or carboxylic acids having a molecular weight of below 350 with addition to the epoxide group in such a way that the reaction products contain a proportion of aromatic groups, calculated as the phenylene group, of 10–45%, and further modifying these reaction products by (C) if appropriate up to 60% by weight, relative to the total binder, of polyfunctional alcohols, carboxylic acids and/or SH compounds having a molecular weight of 500–5,000 and, to obtain the required dispersibility in water, by (D) primary, secondary and/or tertiary amines and/or their salts or a sulfide/acid mixture or phosphine/acid mixture.

Advantageous embodiments of the process according to the invention result from the above process wherein:

(a) epoxide resins based on disphenol A are used as component A;

(b) polyglycidyl esters are used as epoxide resins;

(c) a diol or a dicarboxylic acid having a branched aliphatic chain is used as component B;

(d) a diol or a dicarboxylic acid having at least one quaternary carbon atom is used as component B;

(e) the molecular weight of component C is 530–3,000;

(f) component C is a linear polyester;

(g) component C is a linear polyether;

(h) component C is a linear polyurethane, a linear polyamide or a linear dicarboxylic acid;

(i) component C is a polythioether;

(j) the proportion of component C is 10–50% by weight, relative to the total binder; and (k) the reaction product of components A, B, D and, if appropriate, C is reacted with a partially blocked polyisocyanate which, on average, has one free isocyanate group per molecule and the blocked isocyanate groups of which are stable at room temperature.

The process is carried out as follows: component A and component B are mixed, if appropriate with the addition of catalysts, such as, for example, tertiary amines, completely reacted at temperatures between 100° and 140° C., preferably 115° to 135° C. The degree of conversion can be checked by means of the epoxide equivalent weight. This reaction product from the A and B components can, if appropriate, be further modified at temperatures between 100° and 140° C. by the C component. This reaction can also be monitored by means of the epoxide equivalent weight. The reaction product thus obtained still contains free epoxide groups. For this reaction step, the same catalysts as for the reaction between components A and B can also be used. The reaction product thus obtained is reacted at temperatures between 90° and 120° C. with component D, so that a binder is formed which contains basic amino groups. The basic reaction product can be completely or partially protonated by adding acids and then dispersed in water. The cross-linking agent can be admixed to the binder before the dispersal in water or, depending on reactivity, he added during the preparation of the binder. In the case of partially blocked polyisocyanates, the latter are reacted with the binder at temperatures between 80° and 150° C, preferably at temperatures between 100° and 130° C. The binders obtained are stable dispersions which can be readily handled. It may also be advantageous to dissolve the binders in suitable organic solvents before the preparation of the dispersion. Examples of suitable solvents are glycol ethers, ethylglycol, butylglycol, ketones, such as ethyl diethyl ketone, methyl ethyl ketone and methyl isobutyl ketone, and others.

The invention also relates to the use of binders for electrocoating baths.

The electrocoating baths can contain customary pigments. Frequently a dispersing agent or a surface-active agent is added to the pigments. The pigment and the surface-active agent, if used, are ground together with a part of the binder or on their own, to prepare a paste which is blended with the remaining binder to prepare the coating composition.

In some cases it is advantageous to add to the electrocoating bath a nonionic modifier or solvent in order to improve the dispersibility, viscosity and/or film quality. Examples of such materials are aliphatic, naphthenic and aromatic hydrocarbons or mixtures thereof, mono- and dialkyl ethers of glycols, Siberian pine oil and other solvents which are compatible with the resin system. The currently preferable modifier is 4-methoxy-4-methylpentan-2-one.

The electrocoating bath can also contain other additives, such as antioxidants. Examples of the latter are orthoamylphenol and cresol. The addition of such antioxidants is particularly desirable when the deposition baths are exposed for prolonged periods to atmospheric oxygen at elevated temperatures while being stirred.

Other additives which the bath can also contain, if appropriate, are wetting agents, such as petroleum sulfonates, sulfated fatty amines or their amides, esters of sodium isothionates, alkylphenoxypolyethylene-alkanols or phosphate esters, including ethoxylated alkylphenolphosphates. Other groups of possible additives are antifoam agents and suspending media. Ordinary tap water can also be used for formulating the deposition bath. However, since water of this type contains relatively high proportions of salts, undesirable changes may thereby be caused in the electric deposition. Deionized water is therefore generally preferable.

The possible additives listed above are not complete, since any other additives which do not interfere with the electric deposition can be used.

The invention also relates to a process for electrophoretically coating an electrically conductive substrate connected as the cathode from an aqueous bath based on cationic binders which have been at least partially neutralized with acids, the binders having been rendered, by reaction, self-crosslinkable or the bath containing an additional crosslinking agent, wherein the binders are the products of reacting (A) low molecular weight epoxide resins containing aromatic groups and having an epoxide equivalent weight of below 375, (B) aliphatic and/or alicyclic polyfunctional alcohols and/or carboxylic acids having a molecular weight of below 350, (C) if appropriate up to 60% by weight, relative to the total binder, of polyfunctional alcohols, carboxylic acids and/or SH compounds having a molecular weight of 500–5,000 and (D) primary, secondary and/or tertiary amines and/or salts thereof or a sulfide/acid mixture or a phosphine/acid mixture, the reaction product of A and B containing 10-45% of aromatic groups, calculated as the phenylene group.

Advantageous embodiments of the process for electrophoretic coating result the above process wherein:

(a) component A is an epoxide resin based on bisphenol A;

(b) component A is a polyglycidyl ester;

(c) component B is a diol or a dicarboxylic acid having a branched aliphatic chain;

(d) component B is a diol or a dicarboxylic acid having at least one quaternary carbon atom;

(e) the molecular weight of component C is 530–3,000;

(f) component C is a linear polyester;

(g) component C is a linear polyether;

(h) component C is a linear polyurethane, a linear polyamide or a linear dicarboxylic acid;

(i) component C is a polythioether; and (j) the proportion of component C is 10–50% by weight, relative to the total binder.

The substrate used in the electric deposition can be any electrically conductive substrate. The latter usually are metal substrates, such as, for example, iron, steel, copper, zinc, brass, tin, nickel, chromium or aluminum, and other metals, pretreated metals, also phosphatized or chromatized metals. Impregnated paper and other conductive substrates can also be used.

In cationic deposition, the objects to be coated are immersed in an aqueous dispersion of the solubilized film-forming cationic binder. An electric voltage is applied between the object to be coated, serving as the cathode, and an anode, and the cationic binder is deposited, by the electric current, on the cathode. The object is then removed from the bath and, as a rule, rinsed. The coating is then hardened in a customary manner by heating.

The invention is illustrated in more detail in the Examples which follow. Any parts and percentages indicated are by weight, unless something else is expressly stated.

EXAMPLES 1–5

Preparation of binders

Below, the preparation of binders is described in general, the particular components used and their weights being shown in Table 1.

A reactor which is equipped with a heating device, a stirrer, a thermometer, a condenser and a nitrogen inlet is fed with the epoxide resin component A and the component B and 0.54% by weight of dimethylbenzylamine, relative to the weight of component A. The temperature is increased to 131° C. and the reaction is carried out until the epoxide equivalent weight corresponding to the stoichiometry is reached (stage 1). Component C, dissolved 80% strength in xylene, and 0.41% by weight of dimethylbenzylamine, relative to the weight of component A, are then added. The reaction temperature of 131° C. is maintained until the epoxide equivalent weight corresponding to the stoichiometry is reached (stage 2). 33% by weight, expressed as solids, of the crosslinking agent solution described in Example 9 is then added. The temperature of the reaction batch is lowered to 90° C. by external cooling, and 9.9% by weight of the ketimine obtained by reacting diethylenetriamine with methyl isobutyl ketone and 7.8% by weight of N-methylethanolamine are added. The temperature is allowed to increase to 112° C. and the batch is maintained for one hour at this temperature. 6.5% by weight of 2-ethoxyethanol are then added and mixed in for 15 minutes. The resin solution can then be dispersed in water. For this purpose, a mixture of deionized water, glacial acetic acid and a commercially available emulsifier solution has been prepared. The mount of glacial acetic acid is so chosen that 33% of the nitrogen atoms contained in the resin molecule are protonizable. The amount of deionized water is so calculated that a 55% strength dispersion is obtained. The resin solution is stirred into this aqueous mixture. The temperature for this step must be below 50° C. After 4 hours a further amount of deionized water is added to the dispersion to adjust the solids content of the dispersion to 36%.

In Table 1, EEW stands for epoxide equivalent weight.

TABLE 1

| | Component A | Weight of A (g) |
|---|---|---|
| Resin 1 | commercially available epoxide resin based on bisphenol A and having an epoxide equivalent weight of 188 | 1337 |
| Resin 2 | commercially available epoxide resin based on bisphenol A and having an epoxide equivalent weight of 188 | 1357 |
| Resin 3 | commercially available epoxide resin based on bisphenol A and having an epoxide equivalent weight of 188 | 1244 |
| Resin 4 | commercially available epoxide resin based on bisphenol A and having an epoxide equivalent weight of 188 | 1282 |
| Resin 5 | commercially available epoxide resin based on bisphenol A and having an epoxide equivalent weight of 188 | 1341 |

| | Component B | Weight of B (g) | EEW 1st stage |
|---|---|---|---|
| Resin 1 | 1,6-Hexanediol | 210 | 435 |
| Resin 2 | Neopentylglycol | 181.5 | 428 |
| Resin 3 | 2-Methyl-2-propyl-1,3-propanediol | 218.7 | 442 |
| Resin 4 | Adipic acid | 249 | 449 |
| Resin 5 | Dimethylmalonic acid | 173.5 | 442 |

| | Component C | Weight of C (g) | EEW 2nd stage |
|---|---|---|---|
| Resin 1 | Neopentylglycol/adipic acid polyester having an OH number of 220 | 453 | 1125 |
| Resin 2 | commercially available polylactone-polyol having a molecular weight of 550 | 462 | 1121 |
| Resin 3 | Polytetrahydrofuran having a molecular weight of 650 | 538 | 1209 |
| Resin 4 | commercially available polylactone-polyol having a molecular weight of 530 | 469 | 1173 |
| Resin 5 | Polyether-polyurethane having an OH number of 87.6 | 840 | 1524 |

EXAMPLE 6

Preparation of another binder

A reactor which is equipped with a heating device, a stirrer, a thermometer, a condenser and a nitrogen inlet is fed with 2,350 g of an 80% strength bisphenol A diglycidyl ether solution in xylene and 1,040 g of 2-methyl-2-propyl-3-hydroxypropyl-2-methyl-2-propyl hydroxypropionate. The reaction batch is heated to 125° C. On obtaining a homogeneous mixture, 29 g of dimethylbenzylamine are added. The temperature is then rapidly increased to 132° C. When an epoxide equivalent weight of 1,460 has been obtained, 2,328 g of the crosslinking agent solution described in Example 9 are added, the temperature is lowered by external cooling to 90° C. and 178 g of a ketimine formed from diethylenetriamine and methyl isobutyl ketone and 157 g of diethanolamine are added. The commencing exothermal reaction is allowed to increase the temperature to 113° C., and this temperature is maintained for one hour. 339 g of 2-ethoxyethanol are then added and mixed in for 20 minutes. In the meantime, a dispersing bath of 5,320 g of deionized water, 48.5 g of art emulsifier solution and 36 g of glacial acetic acid has been prepared. The resin solution is stirred into this dispersing bath. During this step, the temperature of the dispersion must not exceed 65° C. The dispersion is allowed to age for 3 hours, and a further 1,516 g of water are then added.

EXAMPLE 7

Preparation of a self-crosslinking binder (resin dispersion 7)

The batch described in Example 6 is repeated, and the reaction is carried out until an epoxide equivalent weight of 1,460 has been obtained. 715 g of an 85% strength solution of a semiblocked diisocyanate in methyl isobutyl ketone are then added. (The semiblocked diisocyanate is the reaction product of toluylene diisocyanate and 2-ethylhexanol). The addition reaction is carried out for one hour at 120° C. The temperature is then lowered to 90° C., and 178 g of a ketimine formed from diethylenetriamine and methyl isobutyl ketone and 157 g of diethanolamine are added. The commencing exothermal reaction is allowed to increase the temperature to 113° C., sad this temperature is maintained for one hour. 334 g of 2-ethoxyethanol are then added and mixed in for 20 minutes. In the meantime, a dispersing bath of 2,148 g of deionized water, 36 g of glacial acetic acid and 45 g of an emulsifier solution has been prepared. The resin solution is stirred into the dispersing bath. After one hour 5,745 g of deionized water are added. The product is then filtered.

EXAMPLE 8

Preparation of a polyether-urethane for use as component C 1,226.4 parts of polyglycol (molecular weight=200) are initially introduced at room temperature into a reaction vessel equipped with an internal thermometer, stirrer, reflux condenser, dropping funnel and protective gas inlet. 773.6 parts of hexamethylene diisocyanate are gradually added dropwise in the course of 4 hours. The reaction temperature is maintained below 40° C. by external cooling. The reaction mixture is then further reacted for 1 hour at 40° C. and the addition reaction is completed after a further 2 hours at a temperature of 60° C. The product has an NCO content of <0.05%, and the OH number is 87.6. The polyether-urethane has a waxy consistency at room temperature.

EXAMPLE 9

Preparation of a crosslinking agent

A reactor which is equipped with a heating device, a condenser, a stirrer, a thermometer, an outlet line which leads to a washing device and an inlet for passing in nitrogen is fed with 12,280 parts of toluylene diisocyanate (mixture of about 80% of 2,4-toluylene diisocyanate and about 20% of 2,6-toluylene diisocyanate). Nitrogen is passed in, and the condenser is switched on. 5,550.5 parts of 2-ethylhexanol are gradually added in the course of 5 hours, during which period the temperature gradually increases to 50° C. While the temperature of 50° C. is being maintained, a further 3,649.5 parts of 2-ethylhexanol are added in the course of 4 hours. The reaction mixture is kept for 75 minutes at 50° C., the condenser is then switched off, and 3.6 parts of dibutyltin dilaurate are added. The heating device is switched on, and the reaction mixture is heated in the course of 45 minutes to 65.6° C. 3,184 parts of 1,1,1-trimethylolpropane are added in the course of two hours and 50 minutes during which period the temperature increases from 65.6° to 120° C. The reaction mixture is maintained for 90 minutes at this temperature, and 10,560 parts of 2-ethoxyethanol are then added. The resulting product is a solution of a polyurethane crosslinking agent.

EXAMPLE 10

Preparation of a milling binder and of a pigment paste

A reactor which is equipped with a heating device, a condenser, a stirrer and a nitrogen inlet is fed with 1,948 g of bisphenol A diglycidyl ether and 817 g of 2-dimethyl-3-hydroxypropyl-2-dimethyl 3-hydroxypropionate. The batch is then heated and the temperature is maintained at 132° C. until an epoxide equivalent weight of 1,350 has been reached. 675 g of a 90% strength solution, in methyl isobutyl ketone, of the semiblocked diisocyanate formed from 2-ethylhexanol and toluylene diisocyanate are then added. 3,109 g of butylglycol are then slowly added, and the batch is cooled down to 80° C. In the meantime, the following ammonium salt has been prepared: in 40.4 parts of butylglycol, the reaction product of 89.9 parts of diethanolamine and 330.9 parts of a semiblocked diisocyanate formed from 2-ethylhexanol and toluylene diisocyanate (95% to strength in methyl isobutyl ketone) is neutralized with a mixture of 121.3 parts of 88% strength lactic acid and 95.7 parts of deionized water. 884.1 g of this ammonium salt are added. A further 220 g of butylglycol are then added, and the batch is maintained for 4 hours at 80° C. The resin solution is then filtered.

A clear solution of 224 g of resin solution, 419 g of deionized water and 3.2 g of dibutyltin oxide is then prepared. Milling is carried out in a mill down to Hegman fineness 7, and the milled material is then filtered.

The pigment paste is formulated from the following components: 387 g of the resin solution are mixed with 631 g of deionized water, 387 g of aluminum silicate, 68 g of lead silicate and 54.2 g of carbon black. The mixture is milled for 15 minutes in a Cowles mill. 34 g of strontium chromate are then added. The material is then milled in a mill down to Hegman fineness 7. A further 55.5 g of the clear solution described above are then admixed. The mixture is filtered and used as a black pigment paste.

EXAMPLES 11–17

Preparation of deposition baths and coating of sheets of metal

The resin dispersions described in Examples 1–7 were made up with the pigment paste described in Example 10 according to the following recipe 2,100 g of resin dispersion,
710 g of pigment paste,
25 g of 10% strength acetic acid and
2,165 g of water.

The finish film was deposited onto sheets of metal connected as the cathode using 260V at 25° C. for a time of 120 seconds. The sheets of metal were then removed from the deposition bath, rinsed with deionized water and blown dry with air. The finish film was hardened in a circulating air furnace at 180° C. for 20 minutes. All the sheets of metal had then been coated with a high quality, thick primer coating film. The results are shown in Table 2.

In Table 2, bender 127, bender 132 and granodine 902 are commercially available zinc phosphatized sheets of steel and in the adhesion column GT 0 denotes very good adhesion and GT 5 denotes poor adhesion.

As Table 2 shows, the binders produce coatings which, after baking, have a layer thickness of 30 to 47 μm. These values are markedly above the layer thicknesses indicated in German Offenlegungsschrift 2,701,002. The baked coatings have a very smooth to smooth surface, very good adhesion and very good to good elasticity.

TABLE 2

| | Layer thickness μm | Substrate | Appearance after hardening | Adhesion GT | Elasticity |
|---|---|---|---|---|---|
| Resin dispersion 1 | 30 | Bonder 132 | smooth surface | 0 | good |
| Resin dispersion 2 | 36 | Bonder 132 | very smooth surface | 0 | very good |
| Resin dispersion 3 | 47 | Bonder 132 | very smooth surface | 0 | very good |
| Resin dispersion 4 | 34 | Granodine 902 | very smooth surface | 0 | good |
| Resin dispersion 5 | 45 | Bonder 127 | smooth surface | 0 | very good |
| Resin dispersion 6 | 42 | Bonder 132 | very smooth surface | 0 | very good |
| Resin dispersion 7 | 38 | Granodine | smooth surface | 0 | very good |

We claim:

1. A water dispersible binder for cationic electrocoating finishes having thick-build characteristics comprising the sequential reaction product of:

(A) a low molecular weight epoxide resin A containing aromatic groups and having an epoxide equivalent weight of below 375;

(B) a first polyfunctional compound B having a molecular weight below 350 and having the formula $$Y-X-[\underset{R^2}{\overset{R^1}{\underset{|}{\overset{|}{C}}}}-(CH_2)_l-\left\{\underset{R^3}{\overset{|}{\underset{|}{CH}}}-(CH_2)_m\right\}_b]_a-Y$$

wherein Y is OH or $CO_2H$ and X is $(CH)_2n$,

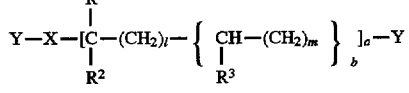

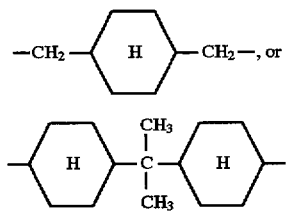

wherein each of $R^1$, $R^2$, and $R^3$ is H or an alkyl radical having 1 to 5 carbon atoms, a is 0 or 1, b is 0 or 1, l is 0–10, and m and n are 1–10;

(C) from 10 to 50% by weight, relative to the total binder, of a second polyfunctional compound C having a molecular weight of 500 to 5,000 selected from the group consisting of a poly alcohol, a poly carboxylic acid and a poly SH compound which is the reaction product of an organic dihalide and a sodium polysulfide; and (D) a component D selected from the group consisting of an amine, a salt of an amine, a sulfide/acid mixture and a phosphine/acid mixture;

wherein, resin A and compound B are first reacted together to form an intermediate which is then reacted with compound C and then with component D to form said binder, said intermediate containing 10–45% of aromatic groups, calculated as phenylene group.

2. The binder of claim 1, wherein component A is an epoxide resin based on bisphenol A.

3. The binder of claim 1, wherein component A is a polyglycidyl ester.

4. The binder of claim 1, wherein component B is a diol having a branched aliphatic chain.

5. The binder of claim 1, wherein component B is a dicarboxylic acid having a branched aliphatic chain.

6. The binder of claim 1, wherein component B is a diol having at least one quaternary carbon atom.

7. The binder of claim 1, wherein component B is a dicarboxylic acid having at least one quaternary carbon atom.

8. The binder of claim 1, wherein the molecular weight of component C is 530–3,000.

9. The binder of claim 8, wherein the polymeric chain of component C is selected from the group consisting of linear polyesters, linear polyethers, linear polyurethanes, linear polyamides, linear dicarboxylic acids and polythioethers; the polyalcohol, polycarboxylic acid or poly SH groups being the terminal groups thereof.

10. The binder of claim 1, which has been reacted with a partially blocked polyisocyanate which, on average, has one free isocyanate group per molecule and the blocked isocyanate groups of which are stable at room temperature.

11. A process for preparing a water-dispersible binder having thick-build characteristics for cationic electrocoating finishes, comprising:

reacting a low molecular weight epoxide resin A containing aromatic groups and having an epoxide equivalent weight of below 375 with a first polyfunctional compound B having a molecular weight below 350 and having the general formula

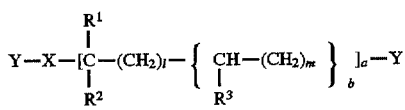

wherein Y is OH or COOH, and X is $(CH_2)_n$,

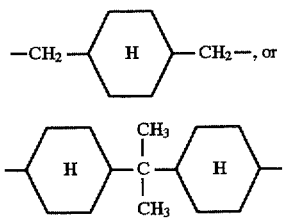

$R^1$, $R^2$, and $R^3$ are H or an alkyl radical having 1 to 5 carbon atoms, a is 0 or 1, b is 0 or 1, l is 0–10, and m and n are 1–10 to produce a first intermediate containing a proportion of aromatic groups, calculated as the phenylene group, of 10–45%; and reacting further the first intermediate with from 10 to 50% by weight relative to the total binder of a second polyfunctional compound C having a molecular weight of 500 to 5000 and selected from the group consisting of a poly alcohol, a poly carboxylic acid and a poly SH compound which is the reaction product of an organic dihalide and a sodium polysulfide to produce a second intermediate; and reacting the second intermediate with a component D selected from the group consisting of an amine, a salt of an amine, a sulfide/acid mixture and a phosphine/acid mixture to form the water-dispersible binder.

12. The process of claim 11, wherein epoxide resins based on bisphenol A are used as component A.

13. The process of claim 12, wherein polyglycidyl esters are used as epoxide resins.

14. The process of claim 11, wherein a diol having a branched aliphatic chain is used as component B.

15. The process of claim 11, wherein a dicarboxylic acid having a branched aliphatic chain is used as component B.

16. The process of claim 11, wherein a diol having at least one quaternary carbon atom is used as component B.

17. The process of claim 11, wherein a dicarboxylic acid having at least one quaternary carbon atom is used as component B.

18. The process of claim 11, wherein the molecular weight of component C is 530–3,000.

19. The process of claim 18, wherein the polymeric chain of component C is selected from the group consisting of linear polyesters, linear polyethers, linear polyurethanes, linear polyamides, linear dicarboxylic acids and polythioethers; the polyalcohol, polycarboxylic acid or poly SH groups being the terminal groups thereof.

20. The process of claim 11, wherein the reaction products of components A, B, C, and D are reacted with a partially blocked polyisocyanate which has one free isocyanate group per molecule, on average, and the blocked isocyanate groups of which are stable at room temperature.

* * * * *